(12) United States Patent
Gotz et al.

(10) Patent No.: US 9,341,242 B2
(45) Date of Patent: May 17, 2016

(54) GEAR DEVICE HAVING AT LEAST ONE ELECTRICAL VARIATOR FOR THE CONTINUOUS VARIATION OF A TRANSMISSION AND COMPRISING POWER SPLIT

(71) Applicant: ZF Friedrichshafen AG, Friedrichshafen (DE)

(72) Inventors: Manuel Gotz, Ravensburg (DE); Gerhard Bailly, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/379,764

(22) PCT Filed: Feb. 1, 2013

(86) PCT No.: PCT/EP2013/052011
§ 371 (c)(1),
(2) Date: Aug. 20, 2014

(87) PCT Pub. No.: WO2013/139519
PCT Pub. Date: Sep. 26, 2013

(65) Prior Publication Data
US 2015/0005131 A1    Jan. 1, 2015

(30) Foreign Application Priority Data
Mar. 21, 2012    (DE) .......................... 10 2012 204 477

(51) Int. Cl.
*F16H 3/72*    (2006.01)
*B60K 6/387*    (2007.10)
(Continued)

(52) U.S. Cl.
CPC ............... *F16H 3/725* (2013.01); *B60K 6/387* (2013.01); *B60K 6/445* (2013.01); *F16H 61/66* (2013.01);
(Continued)

(58) Field of Classification Search
None
See application file for complete search history.

(56) References Cited

U.S. PATENT DOCUMENTS

| 5,309,778 | A | 5/1994 | Antonov |
| 6,558,283 | B1 * | 5/2003 | Schnelle ............ F16H 37/0826 180/65.235 |

(Continued)

FOREIGN PATENT DOCUMENTS

| DE | 197 49 074 A1 | 5/1999 |
| DE | 100 21 025 A1 | 11/2001 |

(Continued)

OTHER PUBLICATIONS

International Search Report Corresponding to PCT/EP2013/052011 mailed May 14, 2013, 7 pages.
(Continued)

*Primary Examiner* — Justin Holmes
(74) *Attorney, Agent, or Firm* — Davis & Bujold, P.L.L.C.; Michael J. Bujold

(57) ABSTRACT

A transmission device with at least one electrical variator for the continuous variation of a transmission ratio and with power branching. A planetary gear unit is coupled to a transmission input shaft and to a shaft of the electrical variator, and also to a change-speed gearbox, in the area of which, in combination with the electrical variator, a number of transmission ratio ranges can be produced. Within the transmission ratio ranges, the transmission ratio of the transmission device can in each case be varied continuously by the electrical variator. Along the power path, between the shaft of the electrical variator connected to the planetary gear unit and the planetary gear unit itself, a mechanism is provided where at least part of the torque transmitted along the power path, between the electrical variator and the planetary gear unit, can be reinforced.

17 Claims, 2 Drawing Sheets

(51) Int. Cl.
  *B60K 6/445* (2007.10)
  *F16H 61/66* (2006.01)
  *B60K 6/547* (2007.10)
  *B60K 6/38* (2007.10)
  *B60K 6/48* (2007.10)
  *F16H 37/08* (2006.01)
  *F16H 37/04* (2006.01)

(52) U.S. Cl.
  CPC .......... *B60K 6/547* (2013.01); *B60K 2006/381* (2013.01); *B60K 2006/4825* (2013.01); *F16H 2037/049* (2013.01); *F16H 2037/0886* (2013.01); *Y02T 10/6239* (2013.01); *Y02T 10/6252* (2013.01)

(56) References Cited

U.S. PATENT DOCUMENTS

| | | | |
|---|---|---|---|
| 6,581,706 B2 | 6/2003 | Bordini | |
| 6,811,508 B2 | 11/2004 | Tumback | |
| 7,712,560 B2* | 5/2010 | Kozarekar | B60K 6/365 180/65.21 |
| 8,777,790 B2 | 7/2014 | Grad et al. | |
| 2007/0087893 A1* | 4/2007 | Tabata | B60K 6/445 477/3 |
| 2007/0202987 A1* | 8/2007 | Kakinami | B60K 6/40 477/3 |
| 2009/0098968 A1* | 4/2009 | Maguire | B60K 6/365 475/5 |
| 2009/0151491 A1 | 6/2009 | Tabata et al. | |
| 2011/0127095 A1* | 6/2011 | Imamura | B60K 6/445 180/65.285 |

FOREIGN PATENT DOCUMENTS

| | | |
|---|---|---|
| DE | 601 33 609 T2 | 6/2009 |
| DE | 10 2010 003 941 A1 | 10/2011 |
| EP | 0 414 782 B1 | 1/1992 |
| WO | 2008/122862 A1 | 10/2008 |
| WO | 2010/144753 A1 | 12/2010 |

OTHER PUBLICATIONS

Written Opinion Corresponding to PCT/EP2013/052011 mailed May 14, 2013.
International Preliminary Report on Patentability Corresponding to PCT/EP2013/052011 mailed May 14, 2013 pages.

* cited by examiner

GEAR DEVICE HAVING AT LEAST ONE ELECTRICAL VARIATOR FOR THE CONTINUOUS VARIATION OF A TRANSMISSION AND COMPRISING POWER SPLIT

This application is a National Stage completion of PCT/EP2013/052011 filed Feb. 1, 2013, which claims priority from German patent application serial no. 10 2012 204 477.9 filed Mar. 21, 2012.

FIELD OF THE INVENTION

The invention concerns a transmission device with at least one electrical variator for the continuous variation of a transmission ratio and with power branching.

BACKGROUND OF THE INVENTION

Transmission devices known from practice for use in mobile working machines such as construction site machines and agricultural machines are increasingly made in the form of continuously power branched transmissions. Depending on the application and intended purpose, these are designed as so-termed primary coupled or secondary coupled transmissions, wherein a primary or secondary coupling indicates the respective position of the rotational speed distribution in the transmission, either at the input or in the area of the transmission output.

Continuously power branched transmission devices of construction site and agricultural machines are often hydrostatically power branched transmissions, in which part of the power passes along a mechanical path and the other part of the power is passed by virtue of the power branching to a hydrostatic variator, in the area of which the continuous adjustment of the transmission ratio takes place. After the power branching, the power components that have passed by way of the two paths are brought together again and passed on toward the drive output.

From DE 601 33 609 T2 and DE 197 49 074 02 drive-train concepts are known, which are made with continuously power branched transmission devices in which, in each case, an electrical variator is provided.

FIG. 1 shows a vehicle drive-train 1A with a transmission device 1 known from the prior art, which comprises an electrical variator 2 for the continuous variation of a transmission ratio of the transmission device 1. A planetary gear unit 3 of the transmission device 1 is coupled with a transmission input shaft 4, a shaft 29 of the variator 2 and a change-speed transmission 5, in the area of which, in combination with the variator 2, in each case four transmission ratio ranges for forward and for reverse driving can be obtained. Within the four transmission ratio ranges, the transmission ratio of the transmission device 1 can in each case be adjusted continuously by means of the variator 2, and for that purpose the variator 2 is also connected in the area of a second shaft 21 to the transmission input shaft 4. The variator 2 comprises a first electric machine 7A and a second electric machine 7B, each of which can be operated as a motor and as a generator.

Besides the planetary gear unit 3, the change-speed gearbox 5 comprises three further planetary gearsets 8 to 10, whose shafts can be coupled to one another by way of five frictional shifting elements 11 to 15 in the manner described in more detain later in order to obtain the four transmission ratio ranges, and all of which are arranged coaxially on the transmission input shaft 4.

On the transmission output side of the change-speed gearbox 5, two further frictional shifting elements 17 and 18 are provided, such that when the frictional shifting element 17 is closed forward driving is possible, whereas when the frictional shifting element 18 is closed a vehicle constructed with the vehicle drive-train 1A and the transmission device 1 can be operated in the reverse driving direction.

In the area of a further frictional shifting element 19 the transmission input shaft 4 connected to a drive engine 20 of the vehicle drive-train can be coupled to a drive input shaft 22 by means of which auxiliary power takeoff drives of a vehicle, preferably one in the form of a tractor or the like, can be powered.

In this case the first planetary gear unit 3 is functionally connected in the area of a sun gear 23 to the shaft 29 of the variator 2, while a planetary carrier 24 of the first planetary gear unit 3 is attached in a rotationally fixed manner to a ring gear 25 of the second planetary gearset 8 and to a planetary carrier 26 of the third planetary gearset 9. A ring gear 27 of the first planetary gear unit 3 is coupled to a planetary carrier 28 of the second planetary gearset 8. A sun gear 30 of the second planetary gearset 8 is connected rotationally fixed to a sun gear 31 of the third planetary gearset 9. A ring gear 32 of the third planetary gearset 9 can be coupled by the first frictional shifting element 11 to a sun gear 33 of the fourth planetary gearset 10, whereas the sun gears 30 and 31 of the planetary gearsets 8 and 9 can be brought into functional connection with the sun gear 33 of the fourth planetary gearset 10 by means of the second frictional shifting element 12. The planetary carrier 24 of the first planetary gear unit 3, the ring gear 25 of the second planetary gearset 8 and the planetary carrier 26 of the third planetary gearset 9 can be brought into functional connection, by means of the third frictional shifting element 13, with a planetary carrier 34 of the fourth planetary gearset 10, which is connected in a rotationally fixed manner to a common outer disk carrier 35 of the frictional shifting elements 17 and 18. A shaft in the form of a ring gear 16 of the fourth planetary gearset 10 can be made rotationally fixed by means of the frictional shifting element 15 in the form of a brake.

An inner disk carrier 36 of the frictional shifting elements 17 is connected in a rotationally fixed manner to a gearwheel 37, which meshes with a spur gear 38 connected in a rotationally fixed manner to a transmission output shaft 39 of the transmission device 1. In addition, an inner disk carrier 40 of the frictional shifting element 18 is coupled to a spur gear 41, which by way of an intermediate wheel 42 that meshes with it, engages with a further spur gear also connected in a rotationally fixed manner to the transmission output shaft 39.

The transmission output shaft 39 is functionally connected by way of a bevel gear, in a manner not illustrated in more detail, to an axle differential transmission device of a driven vehicle axle 44 forming a rear axle of the vehicle, and can be coupled by a further frictional shifting element to a second driven vehicle axle.

To obtain the first transmission ratio range for forward driving or for reverse driving, the frictional shifting elements 11 and 15 must be changed to their closed condition whereas the other frictional shifting elements 12, 13 and 14 must be open. If a change starting from the first to the second transmission ratio range is called for, the first frictional shifting element 11 has to be opened and the second frictional shifting element 12 closed, while the frictional shifting element 15 remains in its closed condition and the shifting elements 13 and 14 remain open.

Starting from the second transmission ratio range, if a change to the third transmission ratio range is called for, the frictional shifting element 15 has to be opened and the frictional shifting element 13 closed, whereas for a change from the third to the fourth transmission ratio range the frictional shifting element 13 has to be opened and the further frictional shifting element 14 changed to its closed operating condition while at the same time the frictional shifting element 12 is closed.

When the first transmission ratio range is engaged, a vehicle constructed with the vehicle drive-train 1A according to FIG. 1 can be operated in a speed range from 0 to around 6 km/h. When the second transmission ratio range is engaged, it can be operated in a speed range from around 6 km/h to around 13.5 km/h, and when the third transmission ratio range is engaged a speed range for operating the vehicle between around 13.5 and around 27 km/h is available. With the transmission device 1 according to FIG. 1, if the fourth transmission ratio range is engaged the vehicle can be operated within a speed range of around 27 to around 58 km/h.

In this case, however, it is problematic that by virtue of the design layout, the maximum transmissible power in the area of the electric machines 7A and 7B in some operating ranges of the vehicle drive-train 1A or speed ranges of a vehicle constructed with the vehicle drive-train 1, restricts a transmission output torque and hence the traction force in the area of the wheels of the driven vehicle axles 44. This occurs particularly in operating ranges within which idle power is circulating, and causes high loading in the area of the electric machines 7A and 7B.

If a vehicle constructed with the vehicle drive-train 1A is operated in operating ranges precisely around a speed at which a shaft of the planetary gear unit 3 connected thereto must be brought to rest by one of the electric machines 7A or 7B, the electric machine 7A or 7B has to be operated as a generator so that in the area of the electric machine the rotational speed in some circumstances has to be controlled to zero, even for a prolonged operating period. Particularly when the electric machine 7A or 7B is controlled without sensors, the regulation of very low speeds down to zero is very complicated.

SUMMARY OF THE INVENTION

Accordingly, the purpose of the present invention is to provide a compact and inexpensive transmission device by means of which a desired drive power in the area of a drive output of a vehicle drive-train can be obtained.

According to the invention, this objective is achieved with a transmission device having the characteristics described below.

In the transmission according to the invention with at least one electrical variator for the continuous variation of a transmission ratio and with power branching, a planetary gear unit is coupled to a transmission input shaft and to a shaft of the electrical variator and also to a change-speed transmission, in the area of which, in combination with the electrical variator, a number of transmission ratio ranges can be produced. In each case, within the transmission ratio ranges the transmission ratio can be varied continuously by means of the electrical variator.

According to the invention, in the power path between the shaft of the electrical variator connected to the planetary gear unit and the planetary gear unit itself, a mechanism is provided, in the area of which at least part of the torque transmitted in the power path between the variator and the planetary gear unit can be reinforced.

By virtue of the mechanism of the transmission device according to the invention, in critical operating ranges, it is made possible in a simple manner to reduce the load on the electrical variator by reinforcing at least part of the torque transmitted in the power path between the variator and the planetary gear unit. This can boost the power of a vehicle drive-train constructed with the transmission device according to the invention without design modifications and without increasing the dimensions of the electrical variator and so also its manufacturing costs and fitting space occupation, while providing a desired drive power during the operation of a drive output of a vehicle drive-train, to the required extent, while saving space and at the same time keeping the production costs down.

Compared with known electrical power-branched transmissions, the transmission device according to the invention is adjusted to the effect that the electric machine arranged in the power branching and whose maximum transmissible power has a limiting effect, is reinforced in such manner that despite its limited power in the power-branched path a higher torque and a higher power can be provided in the area of the planetary gear unit functionally connected thereto, so that a higher torque can be transmitted by the transmission device.

If electric auxiliary consumers of a vehicle constructed with the transmission device are supplied with electric power from the intermediate circuit of the electrical variator, then during a briefly elevated demand for electric power from the intermediate circuit for supplying the auxiliary consumers the possibility arises that the electric machine supplying the auxiliary consumers, which is involved in the support of the planetary gear unit, can be relieved of load by the additional mechanism so that the elevated electric demand due to the auxiliary consumer is covered.

Moreover, within speed ranges in which a shaft of the planetary gear unit has to be brought to rest by the electric machine of the electrical variator, by virtue of the mechanism the shaft of the planetary gear unit can be brought to rest by the mechanism and the electric machine can therefore be relieved of load.

During operating conditions of the transmission device in which small rotational speeds have to be maintained in the planetary gear unit, this too can be done by the mechanism with little effort at the same time as with lower loading of the electrical variator, for example by operating a frictional brake with slight slipping.

In this case, i.e. when low rotational speeds are to be maintained in the area of the planetary gear unit or its shafts, the action mode of the mechanism can be specified in such manner that in the area of the electrical variator or an electric machine thereof no torque has to be reinforced so that the power loss in the area of the electrical variator is reduced and the efficiency of the transmission device is increased.

In a simply designed embodiment of the transmission device according to the invention the mechanism is coupled in the area of the shafts of the electrical variator into the power path between the electrical variator and the planetary gear unit.

In an also simple and inexpensive embodiment of the transmission device according to the invention, the mechanism comprises a brake, for example a disk brake, which is preferably supported relative to the housing of the transmission device and by means of which the torque in the area of the electrical variator can be reduced.

In certain operating ranges of a vehicle drive-train constructed with the transmission device according to the invention, for example during a starting process, high supporting torques and loads arise in the area of the planetary gear unit, which can give rise to high electric loads in the area of the electric machines of the electrical variator that do not occur in other operating and speed ranges of a vehicle drive-train or vehicle constructed with the transmission device.

In the area of the power branching or preferably in the area of an electric machine of the electrical variator, the planetary gear unit is reinforced in a simply designed manner by the brake which, in addition to the electric machine, brakes the gearwheels of the planetary gear unit involved relative to the transmission housing and is preferably operated with some slip.

In this case the brake can be designed as a dry-operating or a wet-operating disk brake. Furthermore, a braking torque can also be provided by a magneto-rheologically operating brake or with the help of other transfer principles by way of hydraulic, electrical or mechanical actuation or a combination thereof.

If the brake is operated in a controlled manner its reinforcing action can be quantitatively regulated very effectively in collaboration with the electric machine of the electrical variator.

To avoid or reduce the power loss occurring in the area of a friction brake, which adversely affects the efficiency of the transmission, in other advantageous embodiments of the transmission device according to the invention the mechanism is constructed with a pump device and/or an electric machine that can operate as a generator, by virtue of which the braking torque to be applied in the area of the mechanism in each case in order to relieve the load on the electrical variator is used to generate electric power or to supply a hydraulic system or the like.

If the electrical variator comprises at least two electric machines, two inverters for controlling the electric machines and an electric intermediate circuit, the transmission device can be produced inexpensively using standard components.

In the case of a primary power-branched transmission device, the planetary gear unit acts as a common gear assembly and gearwheels of the planetary gear unit are supported in the power branch in the area of one of the electric machines of the electrical variator in order to produce a defined transmission ratio of the transmission device.

If the transmission device is designed as a secondary coupled system, the planetary gear unit or gearwheels thereof acting as a distributing gear system in the power branch is supported in the area of one of the electric machines of the electrical variator in order to produce a defined transmission ratio.

Both the features defined in the claims and those indicated in the following example embodiment of the transmission device according to the invention are in each case suitable, whether considered in isolation or in any combination with one another, for the further development of the object of the invention. In relation to such further development of the object of the invention, the respective combinations of features have no restrictive force but are presented only as examples.

BRIEF DESCRIPTION OF THE DRAWINGS

Further advantages and advantageous embodiments of the transmission device according to the invention emerge from the example embodiment whose principle is described with reference to the drawing, which shows.

DETAILED DESCRIPTION OF THE PREFERRED EMBODIMENTS

Figure 1:
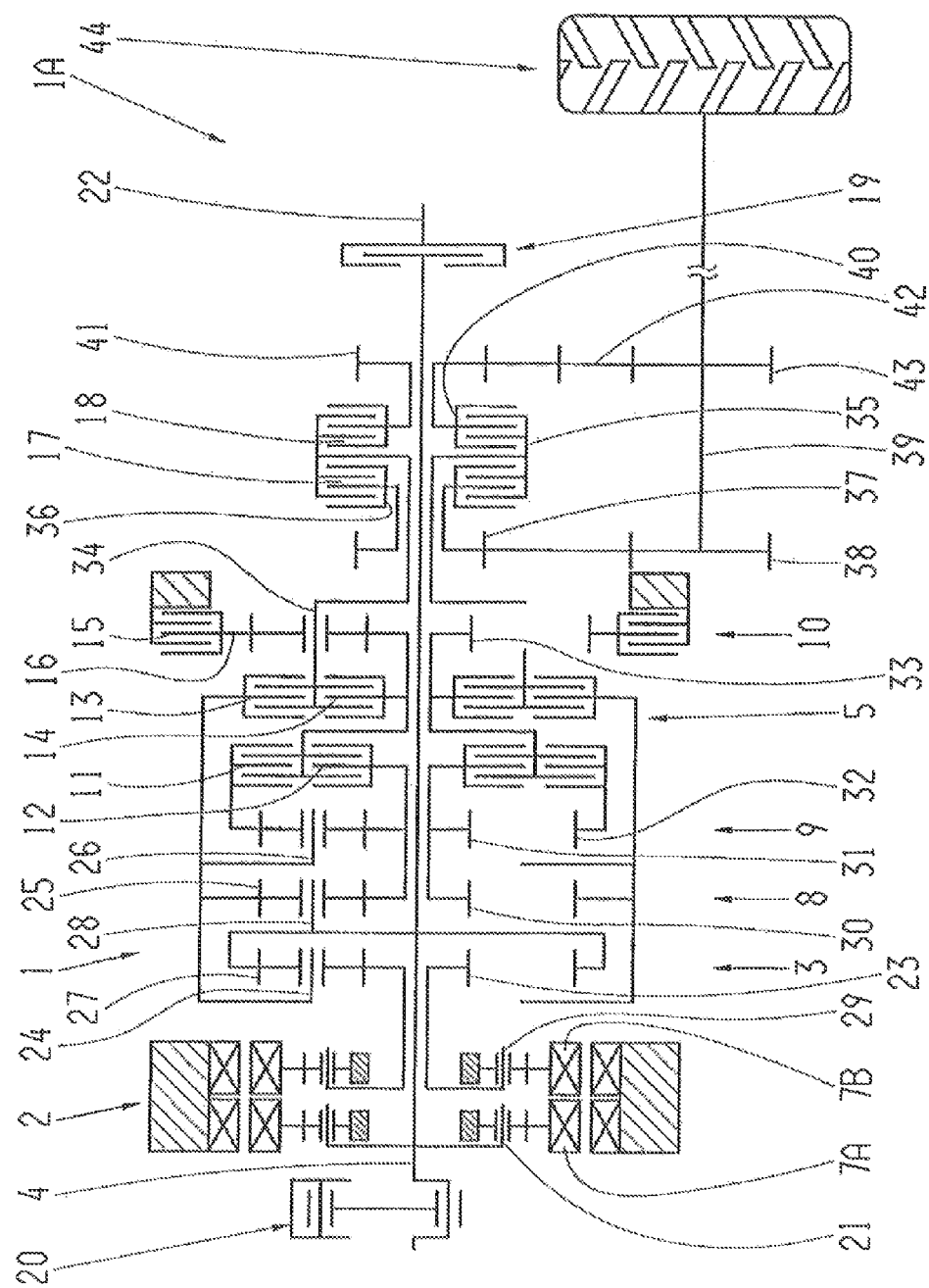
FIG. 1: A schematic representation of a vehicle drive-train constructed with a transmission device known from the prior art.
Figure 2:
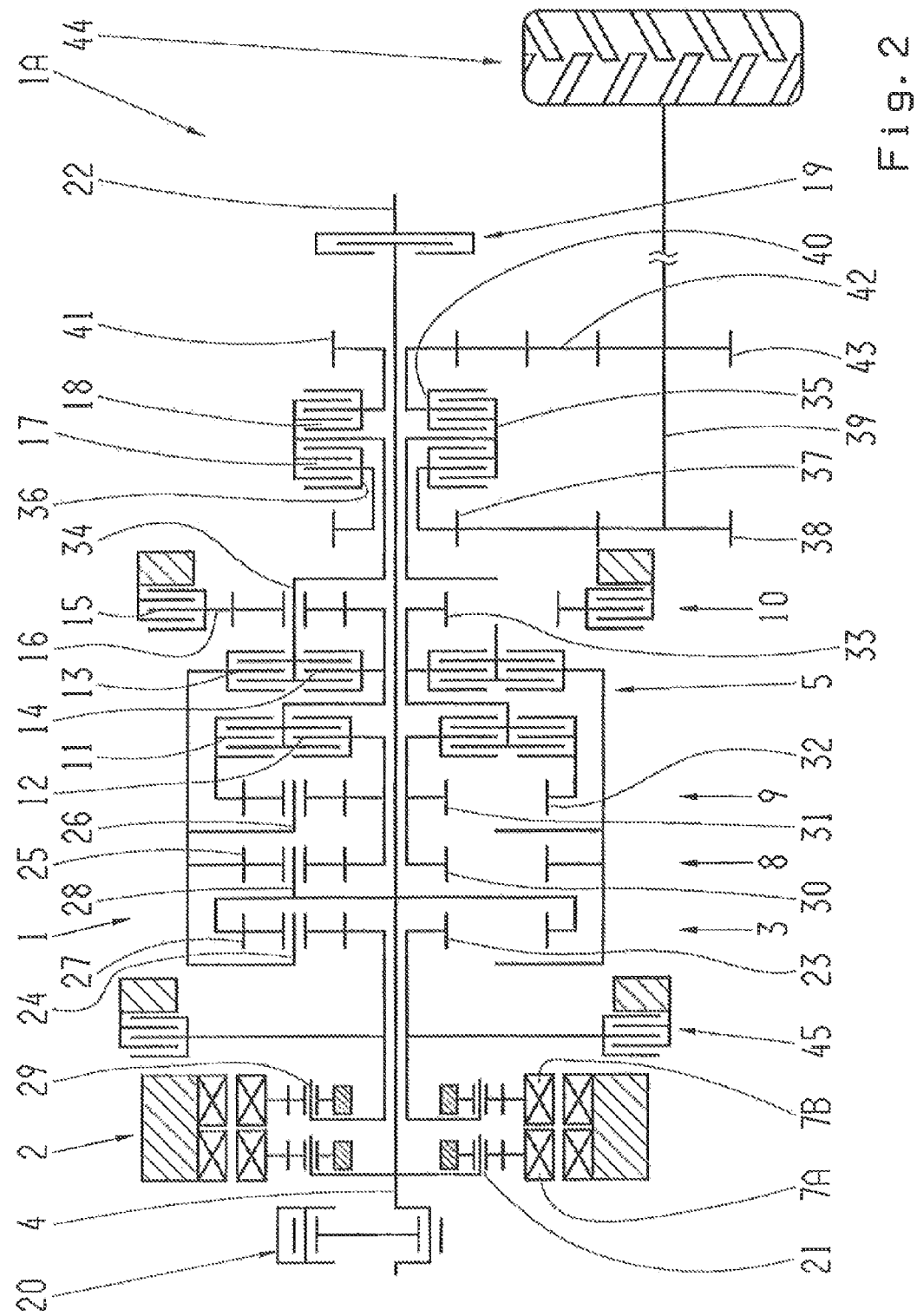
FIG. 2: A representation corresponding to FIG. 1, showing an example embodiment of the transmission device according to the invention.

The example embodiment of the transmission device 1 shown in FIG. 2 comprises essentially the same assemblies as the transmission device 1 in FIG. 1, in order to be able to obtain four transmission ratio ranges for forward and for reverse driving, so that as regards the associated functionality of the transmission device 1 of FIG. 2, reference should be made to the earlier description concerning FIG. 1.

The transmission device 1 in FIG. 2 differs from the transmission device 1 shown in FIG. 1 essentially in that a mechanism 45 comprising a friction brake is provided between the planetary gear unit 3 and the second shaft 29 of the electrical variator 2.

Reaching the maximum permissible power limit in the area of the electrical variator 2, particularly at the beginning of the second and the fourth transmission ratio ranges of the transmission device 1, acts to oppose any appreciable power increase in the vehicle drive-train 1A and thus in the area of the transmission device 1. By virtue of the mechanism 45, on the other hand, the power peaks that occur in the area of the electrical variator 2, which oppose a power increase particularly at the beginning of the second and fourth transmission ratio ranges, are avoided since the load, namely the electric power in the example embodiment of the electrical variator 2 concerned during critical operating conditions, is reduced in a simple manner by appropriate operation of the mechanism 45.

The reduction of the load of the electrical variator 2 is enabled by the fact that during the critical operating range or at the beginning of the second and at the beginning of the fourth transmission ratio range, the electrical variator 2 is operating in a braking mode in order to brake the sun gear 23 of the planetary gear unit 3. The unacceptably high loads in the area of the electrical variator 2 are reduced during slipping operation of the mechanism 45 made with the friction brake.

Moreover, the mechanism can also be made with an electric machine which, compared with the version of the mechanism having a friction brake, is an energetically more favorable design since the braking torque produced in the area of the electric machine can in turn be used to generate electrical power. In a vehicle system this electrical power can be used for charging a battery or even for propulsion purposes.

Alternatively to the design of the mechanism as en electric machine, it is also possible to provide other power-consuming devices such as a pump device or the like, in order to be able, to a desired extent, to reduce a load in the area of the electrical variator during critical operating conditions and at the same time to be able to obtain a desire drive power in the area of the transmission output shaft.

Depending on the application in each case, the mechanism can also be constructed with a friction brake, with a pump and/or with an electric machine, such that the brake, pump and/or electric machine can be operated separately or simultaneously in order to be able, at least partially, to reinforce the torque to be transmitted in the power path between the electrical variator and the planetary gear unit.

INDEXES

1 Transmission device
1A Vehicle drive-train

2 Variator
3 Planetary gear unit
4 Transmission input shaft
5 Change-speed transmission
7A, 7B Electric machine
8 to 10 Planetary gear unit
11 to 15 Frictional shifting element
16 Shaft of the planetary gear unit
17, 18 Frictional shifting element
19 Further frictional shifting element
20 Drive engine
21 First shaft of the variator
22 Drive input shaft
23 Sun gear of the planetary gear unit 3
24 Planetary carrier of the planetary gear unit 3
25 Ring gear of the planetary gear unit 8
26 Planetary carrier of the planetary gear unit 9
27 Ring gear of the planetary gear unit 3
28 Planetary carrier of the planetary gear unit 8
29 Second shaft of the variator
30 Sun gear of the planetary gear unit 8
31 Sun gear of the planetary gear unit 9
32 Ring gear of the planetary gear unit 9
33 Sun gear of the planetary gear unit 10
34 Planetary carrier of the planetary gear unit 10
35 Outer disk carrier of the frictional shifting elements 17 and 18
36 Inner disk carrier of the frictional shifting element 17
37 Gearwheel
38 Spur gear
39 Transmission output shaft
40 Inner disk carrier of the frictional shifting element 18
41 Spur gear
42 Intermediate wheel
43 Further spur gear
44 Driven vehicle axle
45 Mechanism

The invention claimed is:

1. A transmission device (1) comprising:
   at least one electrical variator (2) for continuous variation of a transmission ratio and with power branching,
   a planetary gear unit (3) being coupled to a transmission input shaft (4), a shaft (29) of the electrical variator (2) and a change-speed transmission (5), in an area of which, in combination with the electrical variator (2), a plurality of transmission ratio ranges can be obtained, within which the transmission ratio, in each case, can be continuously varied by the electrical variator (2),
   a mechanism (45) being provided along a first power path, between the shaft (29) of the electrical variator connected to the planetary gear unit (3) and the planetary gear unit (3) itself, in an area of which at least part of the torque transmitted along the first power path, between the electrical variator (2) and the planetary gear unit (3), can be reinforced, and
   the mechanism (45) comprising a brake being constructed as either a pump device or an electric machine that can be operated as a generator.

2. The transmission device according to claim 1, wherein the mechanism (45) is coupled in the first power path, between the electric variator (2) and the planetary gear unit (3), in the area of the shaft (29) of the electric variator (2).

3. The transmission device according to claim 1, wherein the electrical variator (2) comprises at least two electric machines (7A, 7B), two inverters for controlling the electric machines (7A, 7B) and an electric intermediate circuit.

4. The transmission device (1) of claim 1, wherein the first power path passes from the transmission input shaft (4) through the electrical variator (2) to an output shaft (39), and a second power path passes along a mechanical path from the transmission input shaft (4) to the transmission output shaft (39).

5. The transmission device (1) of claim 1, wherein the mechanism (45) includes is the pump device which supplies a hydraulic system.

6. The transmission device (1) of claim 1, wherein the mechanism (45) includes the electric machine which generates electric power.

7. A transmission device (1) comprising:
   at least one electrical variator (2) for continuous variation of a transmission ratio and with power branching,
   a planetary gear unit (3) being coupled to a transmission input shaft (4), a shaft (29) of the electrical variator (2) and a change-speed transmission (5),
   a plurality of transmission ratio ranges can be obtained with the change-speed transmission (5) in combination with the electrical variator (2),
   a transmission ratio, for each of the transmission ratio ranges, being continuously varied by the electrical variator (2),
   a mechanism (45) being arranged along a power path between the shaft (29) of the electrical variator, which is connected to the planetary gear unit (3), and the planetary gear unit (3),
   at least a portion of torque transmitted along the power path, between the electrical variator (2) and the planetary gear unit (3), being reinforced, and
   the mechanism (45) comprising a disk brake and either a pump device or an electric machine that is operable as a generator.

8. The transmission device (1) of claim 7, wherein the mechanism (45) includes the pump device which supplies a hydraulic system.

9. A transmission device comprising:
   at least one electrical variator comprising first and second electrical machines for the continuous variation of a transmission ratio,
   the first electrical machine being coupled to a transmission input shaft and the second electrical machine being coupled to a variator shaft, and the first and the second electrical machines facilitate power branching along first and second power paths;
   a first planetary gear unit being coupled to the transmission input shaft,
   a first powerr path passing from the input shaft through the first electric machine, to the second electric machine and to the first planetary gear unit,
   the change-speed transmission being located axially downstream of the first planetary gear unit,
   the first planetary gear unit and the change-speed transmission comprising planetary gearsets and frictional shifting elements which are engagable for implementing a plurality of transmission ratio ranges;
   a drive input shaft being selectively connectable to the transmission input shaft for transmitting power to an auxiliary power takeoff, and a transmission output shaft being connectable to a drive output of the change-speed transmission for transmitting power to a vehicle axle,
   a mechanism being connected to the variator shaft of the second electrical machine and being axially located between the electrical variator and the first planetary gear unit, the mechanism reinforcing torque along the first power path between the electrical variator and the first planetary gear unit, and the mechanism having a pump device.

10. The transmission device of claim 9, wherein the mechanism includes a disk brake supported relative to a housing of the transmission device.

11. The transmission device of claim 9, wherein the mechanism includes a wet operating disk brake.

12. The transmission device of claim 9, wherein the mechanism includes a dry operating disk brake.

13. The transmission device of claim 9, wherein the pump device supplies a hydraulic system.

14. The transmission device of claim 9, wherein the mechanism includes an electric machine which generates electric power.

15. The transmission device of claim 9, wherein the transmission input shaft is coupled to a ring gear of the first planetary gear unit;

the variator shaft of the second electrical machine is coupled to a sun gear of the first planetary gear unit;

the change speed transmission includes second, third, and fourth planetary gears and five frictional shifting elements;

the ring gear of the first planetary gear is coupled to a carrier gear of the second planetary gear;

a carrier gear of the first planetary gear is coupled to a carrier gear of the third planetary gear and selectively coupleable to a carrier of the fourth planetary gear via one of the five frictional shifting elements; and the transmission input shaft is further coupled to a further frictional shifting element that selectively couples the transmission input shaft to a drive input shaft of a power takeoff drive.

16. The transmission device of claim 9, wherein one of the first electric machine and the second electrical machine is controlled without sensors.

17. The transmission device of claim 9, wherein the mechanism sufficiently reinforces torque such that no torque must to be reinforced by the second electrical machine.

* * * * *